Aug. 18, 1959 W. J. SCHMIDT ET AL 2,900,604
ELECTRICAL MEASURING DEVICE
Filed June 23, 1955

INVENTORS
Warren J. Schmidt &
Emanuel T. Rudy.
BY
ATTORNEY

United States Patent Office 2,900,604
Patented Aug. 18, 1959

2,900,604

ELECTRICAL MEASURING DEVICE

Warren J. Schmidt, Bloomfield, and Emanuel T. Rudy, Belleville, N.J., assignors to Westinghouse Electric Corporation, East Pittsburgh, Pa., a corporation of Pennsylvania Application June 23, 1955, Serial No. 517,488

6 Claims. (Cl. 324—138)

This invention relates to electrical measuring devices and has particular relation to multielement induction watthour meters for measuring the energy of polyphase circuits.

Watthour meters have previously been provided for measuring the energy of polyphase circuits which include a pair of electromagnetic elements positioned to influence suitable armature means. Each of the elements ordinarily includes a magnetic structure having voltage and current poles with an air gap in which the armature means is positioned. The voltage and current poles are provided with suitable winding means effective when energized to produce voltage and current magnetic fluxes cooperating to produce a shifting magnetic field in the air gap. The magnetic fields establish torques which are applied to the associated armature means to effect rotation of the armature means.

In such watthour meters it is desirable that when the electromagnetic elements are similarly energized they apply similar torques to the associated armature means. By reason of variations in materials and dimensions inherent in the manufacturing processes involved, the electromagnetic elements are seldom of identical construction. Consequently, for similar energizations of the elements the torques established thereby may differ in magnitude. For this reason it is customary to provide such meters with phase balance adjusting means operating on one or both of the elements to adjust the torques established by the associated element such that the torques will be substantially equal for similar conditions of energization of the elements.

Such phase balance adjusting means have been constructed in a variety of forms. In application Serial No. 517,595, filed June 23, 1955, by W. J. Schmidt, there is described phase balance adjusting means including a shunt magnetic path positioned to divert a portion of the voltage flux of an associated magnetic structure away from the air gap of the structure. According to such construction the shunt path includes an adjustable magnetic member which is adjustable relative to a symmetrical magnetic structure along an axis extending parallel to the plane of the structure and transverse to the axis of extension of the voltage pole. The voltage pole extends along an axis which coincides with the axis of symmetry of the magnetic structure.

It has been observed that operation of the phase balance adjusting means described in the above referred to application also is effective to modify the response of the meter independently of the modification resulting from the phase balancing action. It is believed that such modification results from the application of a torque to the armature means which is established by distortion of flux of the magnetic structure caused by the magnetic member.

According to the present invention phase balance adjusting means are provided with means for compensating for modification of the response of an associated meter resulting from operation of the adjusting means independently of the phase balancing action. Such compensating means is in the form of magnetic means positioned to distort magnetic flux of the associated magnetic structure so as to establish a compensating torque acting upon the armature means in opposition to the torque established by action of the phase balance adjusting means.

In a preferred embodiment of the invention, the compensating magnetic means comprises a magnetic element of identical construction as the magnetic member which is positioned symmetrically relative to the magnetic member about the axis of extension of the associated voltage pole. In order to provide compensation over the entire range of adjustment of the phase balance adjusting means the compensating magnetic element is mounted for movement in response to adjustment of the adjusting means so as to maintain the symmetrical relationship for any adjusted position of the magnetic member.

It is, therefore, an object of the invention to provide a multielement meter including improved phase balance adjusting means.

It is another object of the invention to provide a multielement watthour meter having phase balance adjusting means which operates to modify the response of the meter independently of the balancing action with improved means for compensating for such modification.

It is a further object of the invention to provide a multielement watthour meter having phase balance adjusting means operating to establish a torque which is applied to the associated armature independently of the balancing action with magnetic means for compensating for such torque.

It is still another object of the invention to provide a multielement watthour meter having phase balance adjusting means operating upon a symmetrical magnetic structure including a pair of magnetic members symmetrically located relative to the axis of symmetry of the structure for adjustment relative to the structure so as to maintain the symmetrical location for any position of adjustment.

It is a further object of the invention to provide a meter as defined in the preceding paragraph wherein the magnetic members are adjustable from an area located beyond one end of the magnetic structure.

Other objects of the invention will be apparent from the following description taken in conjunction with the accompanying drawing, in which.

Figure 1:
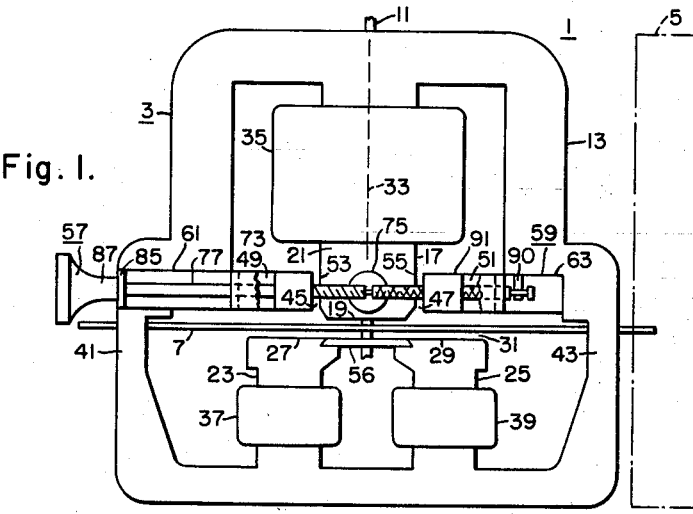
Figure 1 is a view with parts shown diagrammatically of a watthour meter embodying the invention.

Referring to the drawing, there is shown in Fig. 1 a watthour meter represented generally by the numeral 1 embodying the teachings of the invention. The meter 1 includes a pair of electromagnetic elements 3 and 5 of similar construction positioned to influence suitable electroconductive armature means. The armature means is shown in the form of an electroconductive disc 7 secured to a shaft 11 for rotation about an axis under the common influence of the elements 3 and 5. It is understood that the armature means may assume other forms such as a pair of electroconductive discs secured to a common shaft for rotation under the separate influence of each of the electromagnetic elements.

For certain purposes it may be desirable to mount the elements 3 and 5 in a pair of spaced parallel planes to influence the disc 7. In Fig. 1 the element 3 is shown rotated 90° in a counterclockwise direction about the axis of the shaft 11 from the normal position thereof which is in a plane extending transverse to the plane of the paper. The element 5 is illustrated in diagrammatic form in the normal position thereof which is in a plane extending transverse to the plane of the paper. Inasmuch as the elements 3 and 5 are of similar construction, only the element 3 will be described. Further details of the arrangement of the elements of a multielement meter may be found in application Serial No. 517,409, filed June 23, 1955, by B. E. Lenehan.

As shown in Fig. 1, the element 3 includes a magnetic structure 13 preferably formed of a plurality of laminations 15 each having the configuration illustrated in Fig. 1. The laminations 15 may be constructed of any suitable material. Preferably, the laminations are formed of a low loss magnetic material such as high silicon steel. The structure 13 includes a voltage magnetic pole 17 having a pole face 19 and a front surface 21 extending transverse to the pole face 19. The structure 13 further includes a pair of spaced current magnetic poles 23 and 25 having respectively pole faces 27 and 29. The pole faces 27 and 29 are located in a common plane which is parallel to and spaced from the plane of the pole face 19 to define an air gap 31. It is observed that the structure 13 is of symmetrical configuration having an axis of symmetry represented by the dotted line 33 which coincides with the axis of extension of the pole 17.

To permit energization of the element 3, a voltage winding 35 is positioned to surround the voltage pole 17 and a pair of current windings 37 and 39 are positioned to surround respectively the poles 23 and 25. When the winding 35 is energized, magnetic flux produced thereby follows a plurality of paths. A portion of this flux follows a path extending from the pole 17 into the air gap 31, through the disc 7 and through the current poles 23 and 25 in parallel to the pole 17 through side arms 41 and 43 of the structure 13. Another portion of the voltage flux follows a path extending from the pole 17 in parallel through a pair of air gaps 45 and 47 defined respectively by magnetic extensions 49 and 51 of the side arms 41 and 43 and opposing side surfaces 53 and 55 of the pole 17, through the extensions 49 and 51 and back to the pole 17 through the side arms 41 and 43. The winding 35 is adapted to be connected for energization in accordance with voltage of an electrical circuit (not shown).

The windings 37 and 39 are adapted to be connected for series energization in accordance with current of the circuit (not shown) to produce magnetic fluxes having opposing instantaneous directions of flow in the poles 23 and 25. When the windings 37 and 39 are energized, magnetic flux produced thereby will flow through a path extending from pole 23 into the air gap 31 through the disc 7 to the pole face 19 back through the disc 7 to the pole 25 and back to the pole 27. The voltage and current fluxes cooperate to establish a shifting magnetic field in the air gap 31 for applying a torque to the disc 7. A suitable magnetic shunt 56 is positioned between the poles 23 and 25 to provide overload compensation as is understood in the art.

As previously explained, it is desirable that when the elements 3 and 5 are similarly energized they produce substantially equal torques for application to the disc 7. For this purpose phase balance adjusting means may be provided to operate on one or both of the elements 3 and 5 to adjust the torques established thereby. As illustrated, phase balancing adjusting means 57 is provided for the meter 1 to operate upon the structure 13 to divert a portion of the voltage flux of the structure 13 away from the air gap 31 to control the torque applied to the disc 7.

In order to divert a portion of the voltage flux of the structure 13 from the air gap 31, the adjusting means 57 includes a shunt magnetic path which is located on the side of the air gap 31 containing the voltage pole 17 to shunt a portion of the voltage flux from the side arms 41 and 43, the extensions 49 and 51, the air gaps 45 and 47 and the voltage pole 17. For this purpose a magnetic bracket 59 is provided which includes spaced portions 61 and 63 located in a common plane as viewed in Fig. 2 and a portion 65 defining a plane which is spaced from and parallel to the common plane which includes the portions 61 and 63. The portions 61 and 63 of the bracket 59 are connected to the portion 65 by transverse connection portions 67 and 69, respectively.

Figure 3:
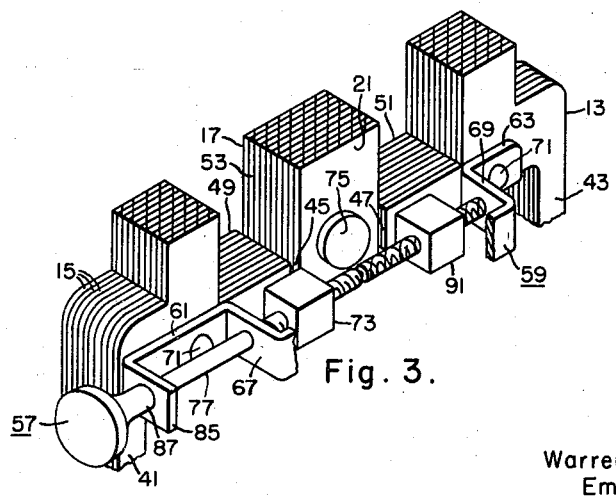
Fig. 3 is a view in perspective with parts shown in section of a portion of the magnetic structure of Fig. 2.

In order to secure the bracket 59 in an operative position the bracket 59 is positioned relative to the structure 13 with the portions 61 and 63 in engagement respectively with the side arms 41 and 43 above the gap 31 as viewed in Fig. 1 to have the portion 65 of the bracket 59 in spaced relation with respect to the structure 13. The bracket 59 may be secured to the structure 13 in any suitable manner such as by rivets 71 which extend through the portions 61 and 63 and the structure 13 as shown in Fig. 3. The bracket 59 may be formed of any suitable magnetic material such as cold rolled steel. With this arrangement a portion of the voltage flux of the structure 13 is diverted from the structure 13 through the bracket 59 away from the air gap 31.

In order to permit diversion of an adjustable portion of the voltage flux to thereby permit adjustment of the torque established by the element 3, the shunt magnetic path including the bracket 59 further includes an adjustable portion which is adjustable to vary the magnetic reluctance of the shunt path. For this purpose a magnetic member 73 is mounted at the side of the structure 13 containing the bracket 59 for adjustment relative to the structure 13. The member 73 may be formed of any suitable magnetic material such as cold rolled steel. The shunt path also includes a magnetic pole piece 75 which is secured to the surface 21 of the pole 17 in spaced relation relative to the member 73. Consequently, by adjusting the member 73 to vary the space between the member 73 and the pole piece 75, the magnetic reluctance of the shunt magnetic path may be varied to thereby adjust the portion of flux traversing the shunt path.

The adjusting means 57 includes actuable means actuable from an area located beyond one end of the structure 13 to effect adjustment of the member 73 relative to the pole piece 75. For this purpose a control shaft 77 is provided including a threaded portion 78 shown in Fig. 2 adapted for engagement with a threaded cavity of the member 73. The shaft 77 is mounted for rotation about an axis extending parallel to the plane of the structure 13 and transverse to the axis 33 to effect movement of the member 73 along the axis of rotation of the shaft 77. Any suitable means may be employed to support the shaft 77 for rotation in this manner. Conveniently the bracket 59 is employed for this purpose.

To this end the bracket 59 is provided with a plurality of spaced bearing means in the form of aligned openings 79, 81 and 83 respectively formed in a transverse terminal portion 85 of the bracket 59 and the transverse portions 67 and 69 of the bracket. These openings are positioned to receive the shaft 77 to permit rotation of the shaft about an axis extending parallel to the plane of the structure 13 and transverse to the axis 33. The shaft 77 is provided with an enlarged end portion 87 proportioned to engage the transverse portion 85 of the bracket 59 to prevent axial movement of the shaft in a direction to the right in Fig. 2. The member 73 is positioned to engage the portion 65 of the bracket to prevent rotation of the member 73 with the shaft 77 and to provide an effective shunt path. With such arrangement rotation of the shaft 77 will effect movement of the member 73 axially of the shaft relative to the structure 13.

Figure 2:
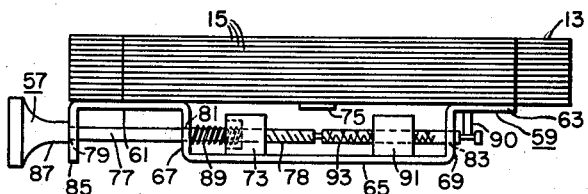
Fig. 2 is a view in top plan of a magnetic structure of the meter of Fig. 1.

As shown in Fig. 2 a suitable coil spring 89 is positioned to surround the shaft 77 between the member 73 and the portion 67 in a tensioned condition. The spring 89 serves to assure positive movement of the member 73 relative to the structure 13. The spring 89 further assists in preventing axial movement of the shaft in a direction to the left in Fig. 2. Such axial movement is also prevented by a spring 90 carried by the bracket for biased engagement with a reduced portion of the shaft 77.

The amount of magnetic flux which traverses the shunt path and consequently the magnitude of the torque which is applied to the disc 7 is determined by the position of the member 73 relative to the pole piece 75. A maximum amount of flux traverses the shunt path when the member 73 is positioned directly opposite the pole piece 75. With such positioning of the member 73 the reluctance of the shunt path is a minimum value with the result that a minimum torque is applied to the disc 7. If the member 73 is positioned as shown in Fig. 2, the reluctance of the shunt path is increased from the reluctance thereof in the previous example so that a lesser amount of flux traverses the shunt path to thereby increase the magnitude of the torque applied to the disc 7. Consequently, by effecting rotation of the shaft 77 the member 73 may be moved relative to the pole piece 75 to adjust the torque applied to the disc 7.

It has been observed that operation of the adjusting means 57 is also effective to modify the response of the meter 1 independently of the modification caused by the flux diverting action previously described. It is believed that the magnetic member 73 operates to distort magnetic flux of the structure 13 which results in the establishment of a torque which is applied to the disc 7. Such a torque may adversely affect the response of the meter 1.

According to the invention, the phase balance adjusting means 57 is provided with means for compensating for modification of the response of the meter 1 resulting from operation of the adjusting means 57 independently of the phase balancing action. In order to provide such compensation the adjusting means 57 includes an auxiliary magnetic element 91 of identical construction as the member 73. The element 91 is positioned to distort magnetic flux of the structure 13 for establishing a torque acting on the disc 7 in opposition to the torque established by the member 73. To this end the element 91 is positioned symmetrically relative to the member 73 about the axis of symmetry 33 of the structure 13. With this arrangement magnetic flux of the structure 13 is distorted symmetrically with respect to the axis 33.

In order to provide compensation which is effective over the entire range of adjustment of the member 73, the element 91 is conveniently mounted on the shaft 77 for movement axially of the shaft in response to rotation of the shaft in a direction which is opposite to the direction of movement of the member 73 effected by such rotation of the shaft. In order to provide such opposing directions of movement of the member 73 and the element 91, the shaft 77 is provided with a threaded portion 93 which is threaded in opposition with respect to the portion 78. Each of the parts 73 and 91 is mounted on the shaft 77 in threaded engagement with a separate one of the oppositely threaded portions 78 and 93 of the shaft. With such arrangement rotation of the shaft 77 in a given direction will effect movement of the member 73 and the element 91 in opposing directions relative to each other axially of the shaft. Such arrangement assures that the member 73 and the element 91 will be symmetrically positioned with respect to each other about the axis 33 for any adjusted position of the member 73.

In order to facilitate assembly of the member 73 and the element 91 to the shaft 77 the invention provides that the shaft 77 have portions 78 and 93 which are threaded in a common direction. Such arrangement permits mounting of the member 73 and the element 91 to the shaft from the same end of the shaft. As shown in Fig. 2, the portions 78 and 93 are both provided with righthand threads with the portion 93 having left-hand threads cut over the right-hand threads thereof.

The invention permits adjustment of the adjusting means 57 from an area located beyond one end of the structure 13 without adversely effecting the response of the meter 1. This is advantageous in installations such as are described in the aforementioned Lenehan application wherein the elements 3 and 5 are mounted in spaced parallel planes which extend between front and rear areas of the meter. In such installations the adjusting means 57 may conveniently be mounted for adjustment from the front area of the meter.

Although the invention has been described with reference to certain specific embodiments thereof, numerous modifications are possible, and it is desired to cover all modifications falling within the spirit and scope of the invention.

We claim as our invention:

1. In an electrical meter, a magnetic structure having an air gap, said magnetic structure including a plurality of magnetic poles, winding means for the magnetic poles effective when energized for producing a plurality of magnetic fluxes cooperating to establish a shifting magnetic field in the air gap, an electro-conductive armature mounted for rotation relative to the magnetic structure about an axis through the air gap under the influence of the magnetic field, and magnetic diverting means for diverting a portion of one of said magnetic fluxes away from the air gap to control the effective strength of the shifting magnetic field, said magnetic diverting means including an adjustable first magnetic member adjustable for effecting diversion of a variable portion of said one of the fluxes to adjust the strength of the magnetic field, said one of said fluxes normally having a symmetrical condition relative to the magnetic structure, said first magnetic member operating also to provide an asymmetrical condition of said one of said fluxes relative to the magnetic structure to adversely affect the response of the meter, and compensating means for substantially compensating for the effect of said first magnetic member upon the response of the meter, said compensating means comprising a second magnetic member movable relative to the magnetic structure and relative to the first magnetic member in response to adjustment of the first magnetic member for effecting diversion of a variable portion of one of said fluxes, said second member being movable to provide with said first member a symmetrical condition of said one of said fluxes relative to said structure for any position of movement of said members.

2. In an electrical meter, a magnetic structure having an air gap, said structure including a voltage magnetic pole and a pair of spaced current magnetic poles, said voltage pole extending along a first axis transverse to the direction of spacing of the current poles, winding means surrounding the voltage and current poles effective when energized to produce voltage and current magnetic fluxes cooperating to establish a shifting magnetic field in the air gap, an electroconductive armature mounted for rotation relative to the magnetic structure about a second axis through the air gap under the influence of the magnetic field, a shunt magnetic path positioned to divert a portion of the voltage magnetic flux away from the air gap, said shunt path including a pair of magnetic members spaced from the magnetic structure at a first side thereof, each of said magnetic members being positioned on a separate side of said first axis symmetrically relative to said first axis, and a magnetic bracket engaging said magnetic structure at spaced points on said first side, said bracket including a portion spaced from the magnetic structure a greater distance than the magnetic members in engagement with the magnetic members; and actuable means carried by the bracket effective when actuated for adjusting the magnetic members relative to the voltage pole in opposing directions with respect to each other along a third axis extending parallel to the direction of spacing of the current poles and transverse to said first axis to effect diversion of a variable portion of said voltage flux for adjusting the strength of the magnetic field, said magnetic members being adjustable to maintain said symmetrical relation for any position of adjustment thereof.

3. In an electrical meter, a magnetic structure having an air gap, said magnetic structure including a plurality of magnetic poles, winding means for the magnetic poles effective when energized for producing a plurality of magnetic fluxes cooperating to establish a shifting magnetic field in the air gap, an electroconductive armature mounted for rotation relative to the magnetic structure about a first axis through the air gap under the influence of the shifting field, magnetic diverting means for diverting a portion of one of said fluxes away from the air gap to control the effective strength of the shifting field, said one of said fluxes normally having a symmetrical condition relative to the magnetic structure, said diverting means including first adjustable magnetic means spaced from the structure, said first magnetic means being adjustable relative to the structure to effect diversion of a variable portion of said one of the fluxes for adjusting the strength of the shifting field, said first magnetic means operating also to adversely affect the response of the meter, and compensating means for compensating for the effect of said first magnetic means upon the response of the meter, said compensating means comprising second magnetic means positioned symmetrically relative to said first magnetic means with respect to the axis of symmetry of said one of said fluxes, said second magnetic means being movable relative to said first magnetic means in response to adjustment of said first magnetic means to maintain said symmetrical relationship of the first and second magnetic means for any position of adjustment of said first magnetic means.

4. In an electrical meter, a magnetic structure having an air gap, said magnetic structure including a plurality of magnetic poles, winding means for the magnetic poles effective when energized for producing a plurality of magnetic fluxes cooperating to establish a shifting magnetic field in the air gap, an electroconductive armature mounted for rotation relative to the magnetic structure about a first axis through the air gap under the influence of the shifting field, magnetic diverting means for diverting a portion of one of said fluxes away from the air gap to control the effective strength of the shifting field, said one of said fluxes normally having a symmetrical condition relative to the magnetic structure, said diverting means including a pair of magnetic members spaced along a second axis which is spaced from the structure at a first side thereof to extend transverse to the axis of symmetry of said one of said fluxes, said magnetic members being positioned symmetrically with respect to each other relative to the axis of symmetry, and a magnetic bracket positioned at said first side in engagement with the structure at spaced points, said bracket including a portion spaced from the structure in engagement with the magnetic members, and actuable means carried by the bracket effective when actuated to adjust the magnetic members simultaneously along the second axis in opposing directions relative to each other, said actuable means comprising a rotatable shaft extending along the second axis for rotation about the second axis with an actuable shaft portion projecting beyond one end of the magnetic structure, said shaft having a pair of threaded portions each in threaded engagement with a separate one if said magnetic members, said portions having first threads cut in a common direction with one portion having additionally second threads cut over said first threads in a direction opposite to said common direction.

5. In a mechanical assembly, a shaft having a pair of threaded portions, and a pair of independent elements each in threaded engagement with a separate threaded portion of the shaft, said threaded portions having first threads cut in a common direction, one of said threaded portions having additionally second threads cut over said first threads in a direction opposite to said common direction.

6. In a mechanical assembly, a shaft having a pair of threaded portions with first threads cut in opposing directions, and a pair of independent elements each in threaded engagement with a separate one of said first threads, one of said threaded portions having additionally second threads cut over its first threads in a direction opposite to the direction of its first threads, said shaft being configured to permit threaded engagement of said elements with the shaft only from one end of the shaft, said shaft being mounted for rotation to simultaneously adjust said elements along the shaft in opposing directions with respect to each other.

References Cited in the file of this patent

UNITED STATES PATENTS

| | | |
|---|---|---|
| 1,821,404 | Rapellin | Sept. 1, 1931 |
| 2,160,416 | Green | May 30, 1939 |
| 2,352,965 | Mendelsohn | July 4, 1944 |
| 2,467,592 | Morgan | Apr. 19, 1949 |
| 2,483,121 | Bourassa | Sept. 27, 1949 |
| 2,626,297 | Leippe | Jan. 20, 1953 |

FOREIGN PATENTS

| | | |
|---|---|---|
| 693,338 | Great Britain | June 24, 1953 |